United States Patent
Kahle et al.

(10) Patent No.: US 7,496,776 B2
(45) Date of Patent: Feb. 24, 2009

(54) POWER THROTTLING METHOD AND APPARATUS

(75) Inventors: James Allan Kahle, Austin, TX (US); David J. Shippy, Austin, TX (US); Albert James Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 10/645,024

(22) Filed: Aug. 21, 2003

(65) Prior Publication Data

US 2005/0044434 A1 Feb. 24, 2005

(51) Int. Cl.
G06F 1/32 (2006.01)

(52) U.S. Cl. ........................ 713/324; 713/320; 713/322; 713/323

(58) Field of Classification Search ................. 713/300, 713/320, 322–324
See application file for complete search history.

(56) References Cited

U.S. PATENT DOCUMENTS

| | | | | |
|---|---|---|---|---|
| 5,878,264 A | * | 3/1999 | Ebrahim | ..................... 713/323 |
| 5,910,930 A | * | 6/1999 | Dieffenderfer et al. | ...... 368/156 |
| 6,625,797 B1 | * | 9/2003 | Edwards et al. | ............... 716/18 |
| 2002/0174319 A1 | * | 11/2002 | Rivers et al. | ................. 712/200 |
| 2003/0065960 A1 | * | 4/2003 | Rusu et al. | ................... 713/300 |
| 2003/0135779 A1 | * | 7/2003 | Takashima et al. | .......... 713/600 |

* cited by examiner

Primary Examiner—Dennis M Butler
(74) Attorney, Agent, or Firm—Carr LLP; Matt Talpis

(57) ABSTRACT

Disclosed is an apparatus which deactivates both the AC as well as the DC component of power for various functions in a CPU. The CPU partitions dataflow registers and arithmetic units such that voltage can be removed from the upper portion of dataflow registers when the software is not utilizing same. Clock signals are also prevented from being applied to these non-utilized components. As an example, if a 64 bit CPU (processor unit) is to be used with both 32 and 64 bit software, the mentioned components may be partitioned in equal sized upper and lower portions. The logic signal for activating the removal of voltage may be obtained from a software-accessible architected control register designated as a machine state register in some CPUs. The same logic may be used in connection with removing voltage and clocks from other specialized functional components such as the floating point unit when software instructions do not presently require same.

9 Claims, 2 Drawing Sheets

POWER THROTTLING METHOD AND APPARATUS

TECHNICAL FIELD

The invention relates to a Central Processing Unit (CPU) control and, more particularly, to reducing power usage in the CPU.

BACKGROUND

In the past there have been two types of power management in computers. A first type is software based which periodically checks to see if computer parts such as the keyboard, the hard disk, the CD drive, and so forth, are being used. If items like the hard drive are no longer being used, the software will typically remove power from the drive motor after a given period of non-use. If the keyboard has not been used for a given time, the display may be removed from the screen and/or power may be removed from the monitor and/or major portions of the CPU. A second type of power control has been labeled in the art as DPM (Dynamic Power Management). Instructions being processed in the computer are monitored and when there are no more instructions to be processed, a DPM module acts to remove clock signals from appropriate portions of the CPU.

It should be noted that there are two types of power usage that occurs in advanced CMOS (Complementary Metal-Oxide Semiconductor) technology. There is active AC power and DC leakage power. As used herein, AC power is that power generated by dynamic dissipation due to switching transient current and charging and discharging of load capacitances. DC leakage power, as used herein, is that power that is generated by static dissipation due to leakage current or other current drawn continuously from the power supply. This DC leakage current, as compared to total current used, increases as CMOS component size decreases.

As noted above, there are many techniques for controlling AC power. These prior art techniques help reduce the AC power component. However, it does not help the DC leakage component because there is still voltage being applied to the circuits. Also, it does not completely shut down the AC component of power.

The architecture of some computers, such as the PowerPC of IBM (International Business Machines), defines a set of architecture control bits in an MSR (Machine State Register). These bits control various functions in the design. One control bit controls the width of the data flow (32 bit or 64 bit). Another bit controls whether there are floating point instructions active.

As known by those skilled in the art, as CPU architectures have evolved, the width of the instruction set architecture has increased to accommodate increases in desired accuracy and processing speed. Original Central Processing Units (CPUs) were 8 bits. Over time, the instruction set data width has been increased to up to 64 bits for present day CPUs. However, even though the width has increased, there remains a considerable amount of software being used which is written for a previous generation's smaller width. Although many of today's CPUs utilize a 64 bit architecture, much of the code used in operating these CPUs is still 32 bits or less. Thus, in many instances of operation, only a portion of the hardware is actively functioning. In other words, if the hardware is designed to accommodate 64 bits, and the software only demands 32 bits, half of the hardware for accommodating the software words is not being used. If the software only demands the use of 16 bits, the software may be using only one-fourth of the hardware. However, even though a portion of the instruction set hardware is not being used, it still, in all known present day CPUs, is using electrical power. The power being used is in the form of clock pulses being applied to data, computation and instruction storage registers as well as DC leakage. Since the power being used is not actively assisting the software, this power is being wasted.

In addition, there are certain workloads which contain only fixed point instructions but contain no floating point instructions.

In view of the above, it would be desirable to deactivate portions of the CPU's circuitry that are not actively engaged in accomplishing steps set forth in the software that is presently being run. Examples of such circuitry being the floating point circuits when there are no floating point instructions in the workload or portions of the computational circuitry when the software running utilizes less than the full instruction width capability of the CPU. It would be further desirable to shut down both the DC leakage power as well as the active AC power for these portions of the CPU.

SUMMARY OF THE INVENTION

The present invention comprises using a CPU architecture control mechanism which shuts down at least one of active AC power and DC leakage components of power for specific functions, or portions of the total CPU circuitry, which are not presently required for the application running on the CPU.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

In the remainder of this description, a processing unit (PU) may be a sole processor of computations in a device. In such a situation, the PU is typically referred to as a CPU (Central Processing Unit). The application of the invention may, however, be readily applied to multiprocessor installations and multiprocessor integrated circuit chips.

Figure 1:
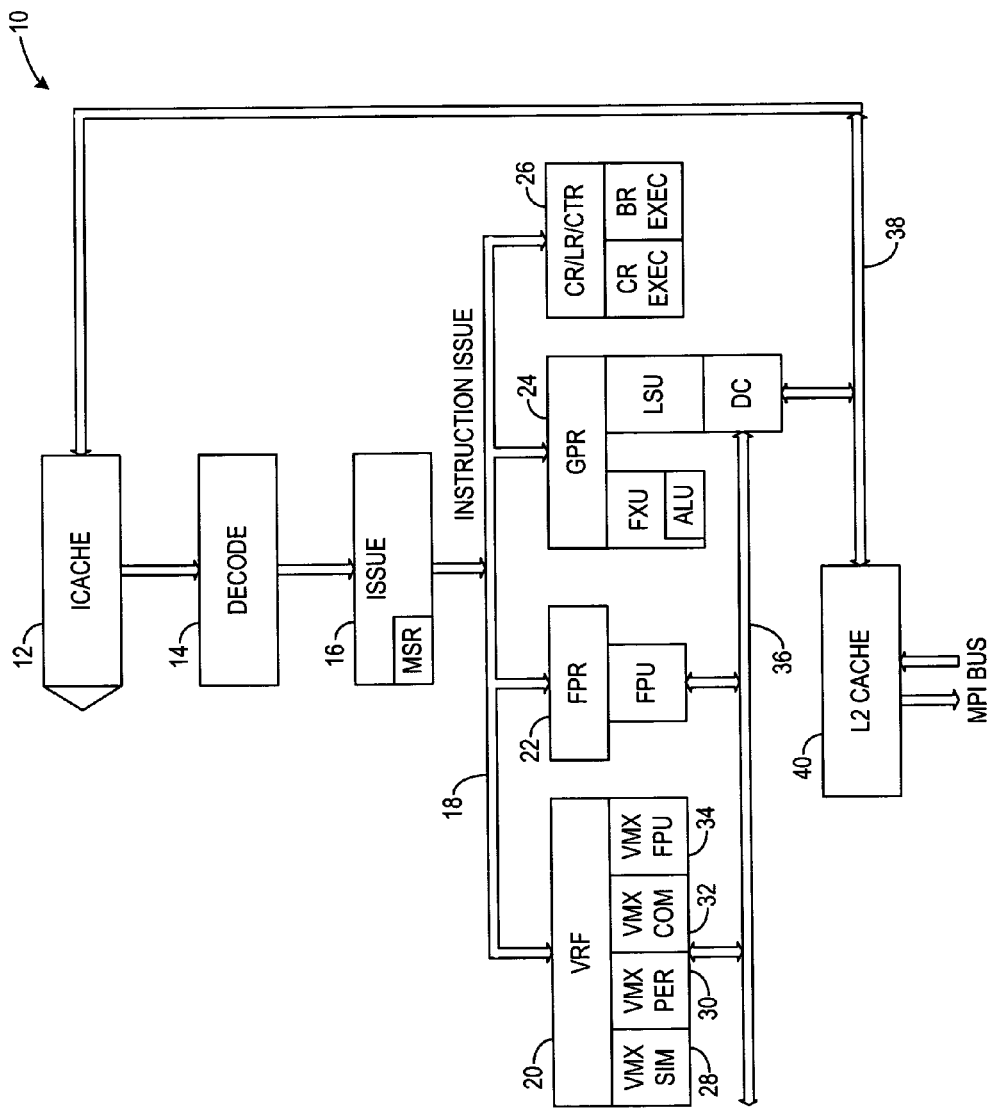
FIG. 1 comprises a simplified block diagram of a CPU shown in more detail in FIG. 2.

FIG. 1 presents a high level representation of a portion 10 of a typical general purpose computer or CPU. An instruction cache 12 fetches instructions from some type of storage (not shown). These instructions are decoded in a block 14 and are issued, via an issue block 16 and a bus 18, to a plurality of execution units 20, 22, 24 and 26. It may be noted that issue block 16 also contains an MSR (Machine State Register) block not numerically designated but discussed later in connection with FIG. 2. The first designated execution unit 20 is shown as a SIMD (Single Instruction Multiple Data stream) VMX (Vector Multimedia Execution) device which comprises a vector register file unit, or VRF, as well as arithmetic subunits designated as 28, 30, 32 and 34. Subunit block 28 is further designated as VMX SIM or simple fixed point subunit. Subunit block 30 is further designated as VMX PER or permute subunit. The subunit block 32 represents a COM or complex fixed point subunit, while subunit block 34 represents a single precision FPU (Floating Point Unit). The second execution unit 22 is a scalar FPU and comprises an FPR (Floating Point Register file) portion and a double precision FPU pipeline portion further designated as FPU. The third execution unit block 24 is a fixed point unit including, as shown, a GPR (General Purpose Register) portion, an FXU (Fixed Point Subunit) portion including an ALU (Arithmetic/Logical Subunit) portion, an LSU (Load/Store) portion and a DC (Data Cache) portion. A bus 36 connects each of the first three execution units to other parts of the computer, such as computer memory. A bus 38 connects the DC (Data Cache) portion of block 24 to the instruction cache 12 as well as to an L2 cache interface 40. The cache 40 is interconnected to other chip components of the computer via a chip bus designated as MPI Bus. The remaining block 26 comprises a branch processing unit including CR (Condition Code Register), LR (Link Register) and CTR (Count Register) portions as well as a CR logic subunit and a BR (Branch) processing subunit. The various portions of block 26 interact with blocks 20, 22 and 24 to process the instructions.

Figure 2:
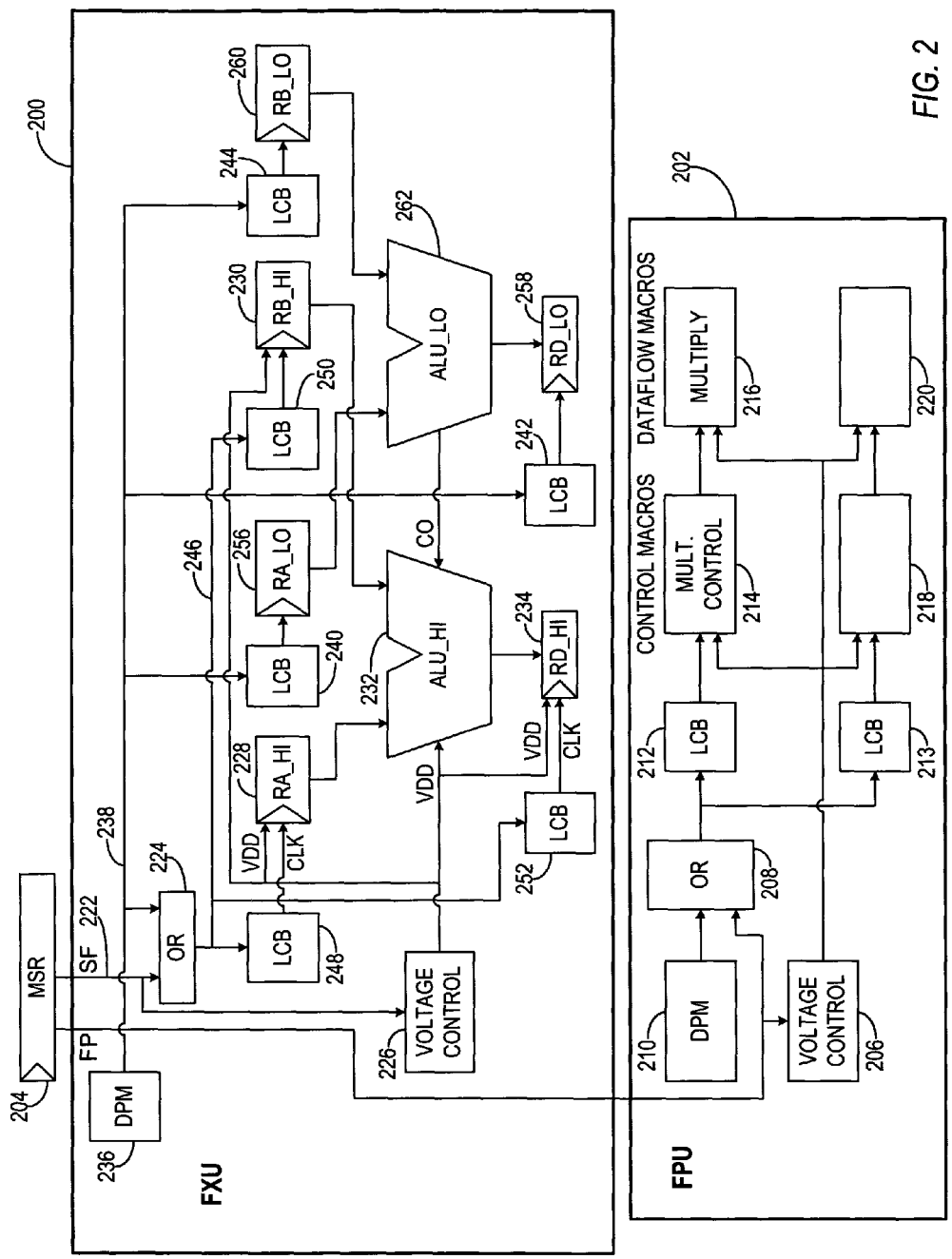
FIG. 2 is a more detailed presentation of a computer CPU such as shown in FIG. 1.

In FIG. 2, a block designated as 200 provides more detail as to the contents of the FXU portion of block 24 in FIG. 1. A block 202, labeled FPU, provides more detail as to the contents of a similarly labeled portion of block 22 in FIG. 1. A block 204, further labeled MSR (Machine State Register) comprises a portion of the issue block 16 in FIG. 1. As known in the art, the ALU (Arithmetic Logic Unit) portion of a CPU can typically, by software direction, be used in either a 32 bit or a 64 bit mode. Although more complicated to design and show, the same teachings as follows may be utilized to permit the CPU to operate in additional modes such as 16 bit and 8 bit. An architected control register, previously referred to as MSR 204, is software accessible. A floating point (FP) bit lead, indicative of the logic value of this bit in register 204, is supplied to a voltage control gate 206 as well as to an OR gate 208 of the FPU block 202. A DPM (Dynamic Power Management) block 210 provides another input to OR gate 208. An output of the OR gate 208 is used to remove DC power from a plurality of blocks in the FPU such as LCBs (Local Clock Buffers) 212 and 213. The deactivation of the LCBs effectively deactivates (lowers the power usage) of downstream blocks, such as a multiply control block 214 and a multiply block 216 used in floating point arithmetic and unlabeled blocks 218 and 220. When the FP bit is a given value, indicating that there is no floating point arithmetic to be performed, such as logic "1", the entire computation portion of the FPU 202 is deactivated. A portion is deactivated through the OR gate 208 to deactivate the LCBs 212 and 213. Further, through the voltage control block 206, the remaining computational blocks, such as 214, 216, 218 and 220, have the DC power removed. This occurs even though the DPM block 210 is indicating that there are still instructions to be processed.

A lead 222, also labeled SF for Sixty Four bit mode, is connected to an OR gate 224 and is also used to activate another voltage control gate 226. Gate 226, when activated, removes power from a lead Vdd to an ANDed input of the upper half dataflow registers 228 and 230 which are further designated as RA_HI and RB_HI, respectively. Lead Vdd is also used to activate (or deactivate) an upper portion of an arithmetic logic unit (ALU_HI) 232 and supplies an input to an ANDed gate portion of a further upper half dataflow register 234 provided with a further designation of RD_HI. A dynamic power management (DPM) block 236 has an output lead 238 connected as a second input to OR gate 224 as well as providing an input to local clock buffers (LCB) 240, 242 and 244. An output of OR gate 224 is supplied on a lead 246 to local clock buffers (LCB) 248, 250 and 252. An output of LCB 248 is supplied as a second input to the AND gate portion of the dataflow register 228. An output of LCB 250 is supplied as a second input to the AND gate portion of the dataflow register 230. An output of LCB 252 is supplied as a second input to the AND gate portion of the dataflow register 234. Outputs of LCB registers 240, 242 and 244 are applied respectively to the lower half dataflow register blocks 256, 258 and 260, which are further labeled respectively RA_LO, RD_LO and RB_LO. An output of block 230 supplies a second input to ALU block 232. A low side ALU_LO block 262 receives input signals from low side register blocks 256 and 260. A carry over (CO) supplies a signal from low side ALU 262 to high side ALU 232 when the computer is in a 64 bit operational mode. Outputs of ALUs 232 and 262 are applied to high and low side registers 234 and 258, respectively.

As may be inferred from the above, this invention provides a mechanism to use architected bits in the MSR to reduce power in the processor. As one example, and as shown in FIG. 2, when the CPU is put in 32 bit mode, the hardware shuts off clocks from LCBs 248, 250 and 252 for all of the upper 32 bits of the dataflow. In addition, it shuts down the power supply for all of the upper 32 bits of register and dataflow logic. Another example shown in FIG. 2 is to use the floating point available (FP) bit in the MSR to shut down power and clocks to the entire floating point unit (FPU).

In more detail, the SF bit output by MSR block 204 feeds logic which shuts down the clocks for the upper half of all registers which transfer data. As shown, these upper half registers are 228 and 230. In addition, it deactivates the DC power supply signal (Vdd) for the registers and logic for the upper 32 bits of dataflow as applied to ALU 232 and its output register 234. As seen in the drawing, there are LCBs for the lower 32 bits and upper 32 bits of each dataflow register. There is logic, via lead 238, to activate (or deactivate) the LCBs 240, 242 and 244 for the lower dataflow registers 256, 258 and 260. This same logic signal affects the LCBs 248, 250 and 252 for upper dataflow registers 228, 230 and 234 through OR gate 224 to shut down the LCBs for normal dynamic power management. For the upper 32 bits of each register, the SF signal from MSR 204 (MSR(SF)) is logically ORed with the DPM shutoff signal to turn ON clock signals coming out of the high level LCBs. In this example, a 64 bit ALU function is divided into the lower 32 bits (ALU_LO) and the upper 32 bits (ALU_HI). In 64 bit mode, the MSR(SF) bit of lead 222 is a logical "1". In this mode, all registers and dataflow are active and the CO of the lower ALU 262 propagates to the upper ALU 232 to form an entire 64 bit result. In the 32 bit mode, the MSR(SF) bit is a logical "0". In this mode, the upper registers and dataflow macros are not clocked and they do not receive power over lead Vdd.

The MSR(FP) bit is used in a similar manner to shut off all clocks and power to all LCBs, macros and registers in the FPU 202.

As mentioned above, the same thought process may be used to save even more power when using a CPU with not only 32 and 64 bit software but additionally with 8 and 16 bit software.

Although the invention has been described with reference to a specific embodiment, the description is not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A method of conserving power in a computer processor, comprising:
    reading a software-accessible control register;
    determining an idle status of a subunit of the computer processor based on the control register;
    providing a clock signal to the subunit based on the determined idle status; and
    providing a power voltage to the subunit based on the determined idle status and a power management signal.

2. The method as recited in claim 1, wherein the control register comprises a plurality of architected bits in a machine state register and at least one bit of the plurality of architected bits is associated with at least one subunit of the computer processor.

3. The method as recited in claim 2, wherein determining the idle status comprises reading the at least one bit associated with the at least one subunit of the computer processor.

4. The method as recited in claim 1, further comprising setting one or more of a plurality of bits in the control register based on an idle status of a subunit of the computer processor.

5. The method as recited in claim 1, wherein the computer processor comprises data flow circuitry comprising a plurality of data flow sections, at least one data flow section configured as a subunit of the computer processor.

6. The method as recited in claim 1, wherein the computer processor comprises upper and lower bit data register circuitry portions, at least the upper bit data register circuitry portion configured as a subunit of the computer processor.

7. The method as recited in claim 1, wherein:
    the computer processor comprises partitioned dataflow registers comprising a lower portion register consistent in size with the lowest instruction width software to be used in the computer processor; and
    the control register comprises an architected control register bit indicating the width of the greatest instruction width presently being used by the computer processor.

8. The method as recited in claim 1, wherein the computer processor comprises partitioned arithmetic logic units (ALUs), comprising an upper ALU and a lower ALU, at least the upper ALU configured as a subunit of the computer processor.

9. The method as recited in claim 1, wherein the computer processor comprises a floating point logic unit (FPU), the FPU configured as a subunit of the computer processor.

* * * * *